(12) United States Patent
Kim et al.

(10) Patent No.: US 7,653,566 B2
(45) Date of Patent: Jan. 26, 2010

(54) SYSTEMS AND METHODS FOR AUTOMATING A PROCESS OF BUSINESS DECISION MAKING AND WORKFLOW

(75) Inventors: Kyu Dong Kim, Seoul (KR); Young Hoon Kim, Centreville, VA (US); Byung Kwon Kwak, Incheon (KR); Gab Youl Lim, Centreville, VA (US)

(73) Assignee: Handysoft Global Corporation, Falls Church, VA (US)

( * ) Notice: Subject to any disclaimer, the term of this patent is extended or adjusted under 35 U.S.C. 154(b) by 1291 days.

(21) Appl. No.: 09/725,933

(22) Filed: Nov. 30, 2000

(65) Prior Publication Data

US 2002/0065701 A1    May 30, 2002

(51) Int. Cl.
*G06F 9/46* (2006.01)
(52) U.S. Cl. ............................................. 705/9
(58) Field of Classification Search ............... 705/1, 705/8, 9, 11; 715/530
See application file for complete search history.

(56) References Cited

U.S. PATENT DOCUMENTS

| | | | | |
|---|---|---|---|---|
| 4,942,527 | A | * | 7/1990 | Schumacher .................... 705/9 |
| 5,182,705 | A | * | 1/1993 | Barr et al. ....................... 705/11 |
| 5,216,592 | A | * | 6/1993 | Mann et al. ...................... 705/8 |
| 5,255,181 | A | * | 10/1993 | Chapman et al. ............... 705/8 |
| 5,301,320 | A | | 4/1994 | McAtee et al. |
| 5,548,506 | A | * | 8/1996 | Srinivasan ....................... 705/8 |
| 5,867,824 | A | * | 2/1999 | Saito et al. ....................... 705/9 |
| 5,930,512 | A | * | 7/1999 | Boden et al. ................... 717/102 |
| 5,999,911 | A | * | 12/1999 | Berg et al. ....................... 705/9 |
| 6,006,193 | A | * | 12/1999 | Gibson et al. ................... 705/8 |
| 6,078,982 | A | * | 6/2000 | Du et al. ........................ 710/200 |
| 6,151,583 | A | | 11/2000 | Ohmura et al. |
| 6,223,177 | B1 | * | 4/2001 | Tatham et al. ................... 707/9 |

(Continued)

FOREIGN PATENT DOCUMENTS

JP        2001-52220        2/2001

(Continued)

OTHER PUBLICATIONS

Workgroup automation tools for end users. (Software Review) (Office IQ) (Evaluation). Nicolaison, Nancy. Windows Sources, v1, n4, p. 188 (2), May 1993.*

(Continued)

*Primary Examiner*—Jonathan G. Sterrett
*Assistant Examiner*—Peter Choi
(74) *Attorney, Agent, or Firm*—H.C. Park & Associates, PLC

(57) ABSTRACT

A system and method for automating a business procedure is disclosed. The workflow management system includes an administrator, a process designer, a workflow database, a process engine and a web client. The system may interact with a form generator and a business application program. The system first analyzes the business process and models the process as a combination of detailed activities. The system assigns the properties to each activity according to the business rules. After modeling the business process and after the business process is initiated, the process engine allocates the workitems to the participant. The system can automate a very complicated business process and can be expanded and adapted to ever-changing business environments.

42 Claims, 16 Drawing Sheets

U.S. PATENT DOCUMENTS

| | | | |
|---|---|---|---|
| 6,308,188 B1 * | 10/2001 | Bernardo et al. | 715/530 |
| 6,311,192 B1 * | 10/2001 | Rosenthal et al. | 707/200 |
| 6,393,456 B1 * | 5/2002 | Ambler et al. | 709/200 |
| 6,430,538 B1 * | 8/2002 | Bacon et al. | 705/9 |
| 6,728,947 B1 * | 4/2004 | Bengston | 717/103 |
| 6,850,895 B2 * | 2/2005 | Brodersen et al. | 705/9 |
| 2002/0091560 A1 | 7/2002 | Suzuki et al. | |

FOREIGN PATENT DOCUMENTS

| | | | |
|---|---|---|---|
| WO | WO 94/29804 | * | 10/1994 |

OTHER PUBLICATIONS

On-line registration at East Tennessee State University-just a first step toward an integrated database. Jonson, S. H., Computer Services, East Tennessee State Univ., Jonson City, TN, USA. Conference Title: association for Educational Data Systems. 1978.*

Workgroup automation tools for end users. (Software Review) (Office IQ) (Evaluation, Nicolaisn, Nancy. Windows Sources v1, n4, p. 188(2), May 1993.*

Basu, Amit; Blanning, Robert W.; "A Formal Approach to Workflow Analysis", Information Systems Research, Mar. 2000, pp. 17-36.*

Leymann, F.; Roller, D.; "Workflow-Based Applications", IBM Systems Journal, 1997, pp. 102-123.*

Zhao, J. Leon; Kumar, Akhil; Stohr, Edward A.; "Workflow-centric Information Distribution Through E-mail", Journal of Management Information Systems, Winter 2000, pp. 45-72.*

* cited by examiner

Fig. 1 Business Process Example
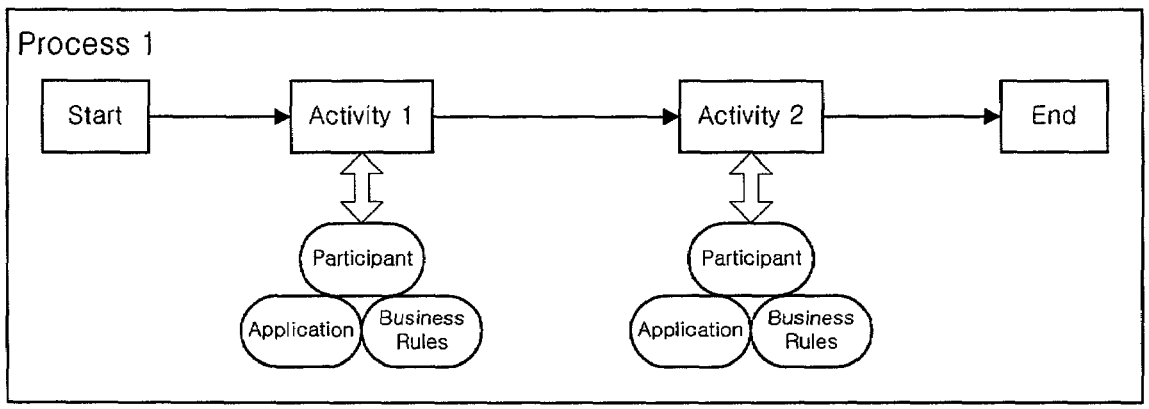
Fig. 2 System Architecture
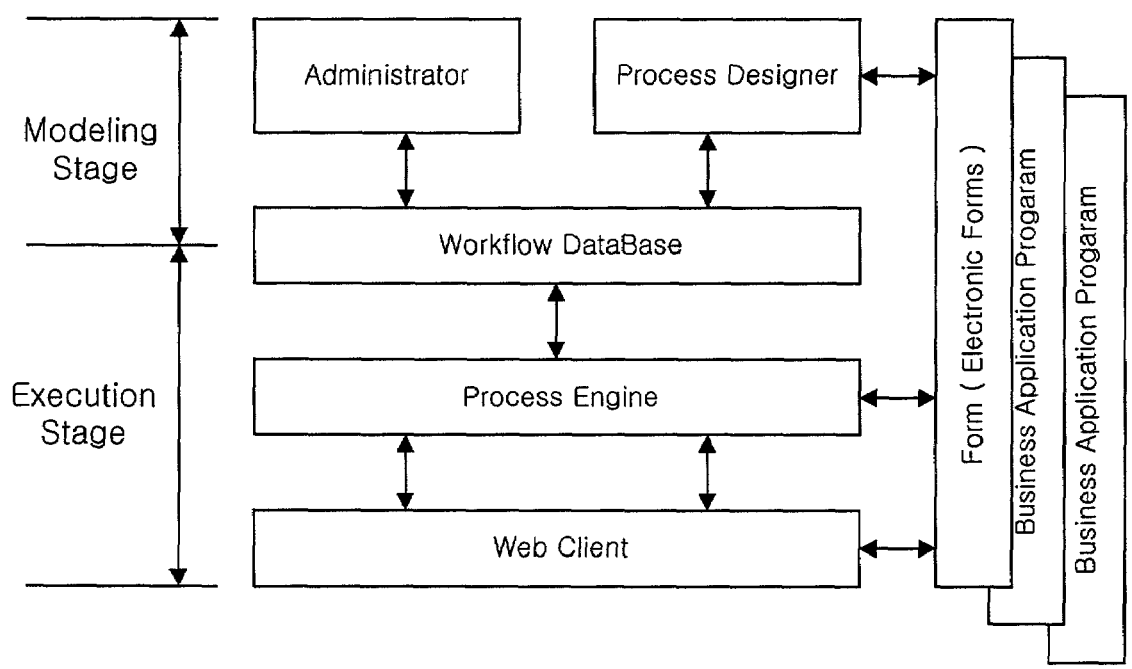

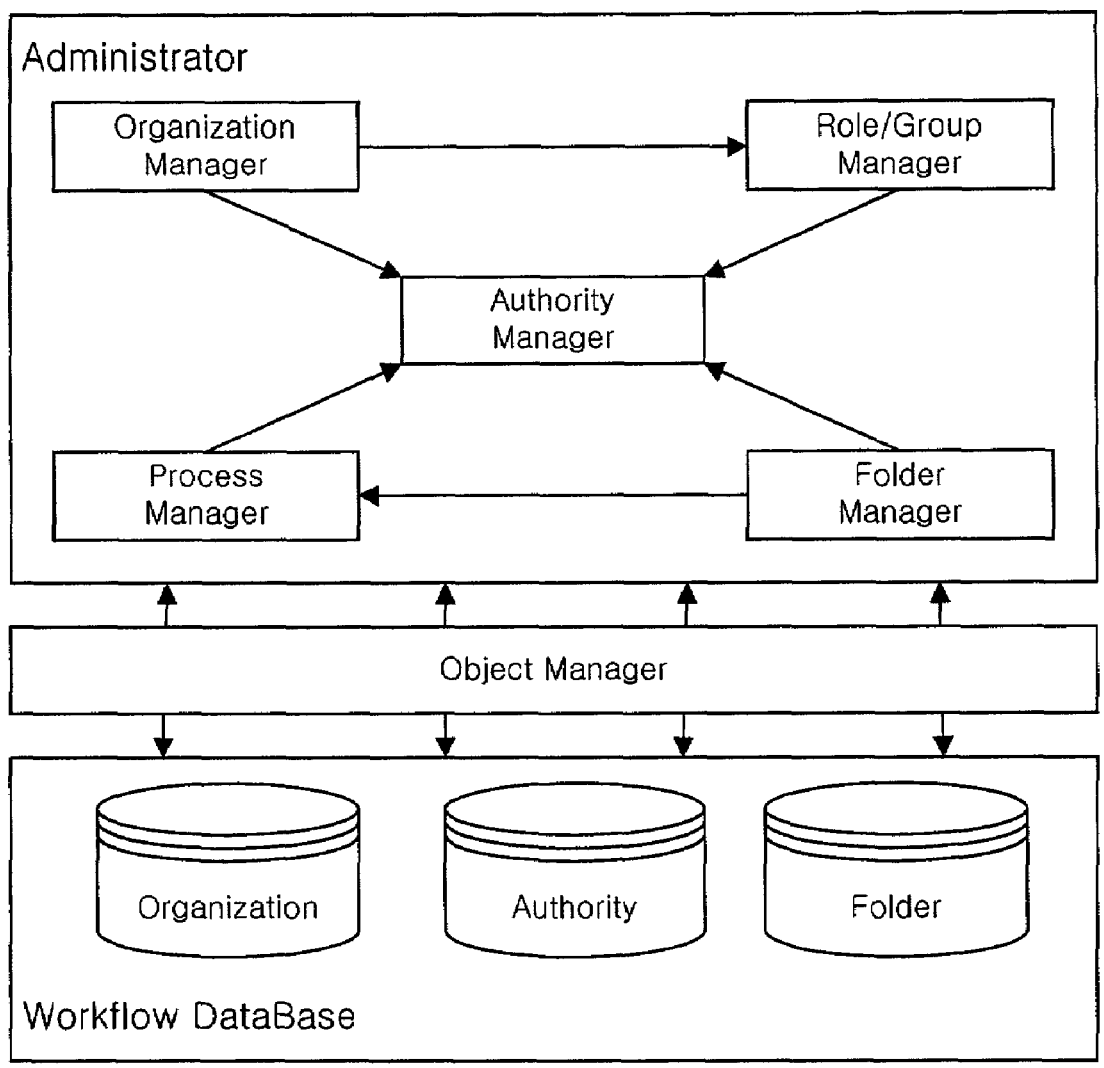
Fig. 3 Administrator

Fig. 4 Process Designer
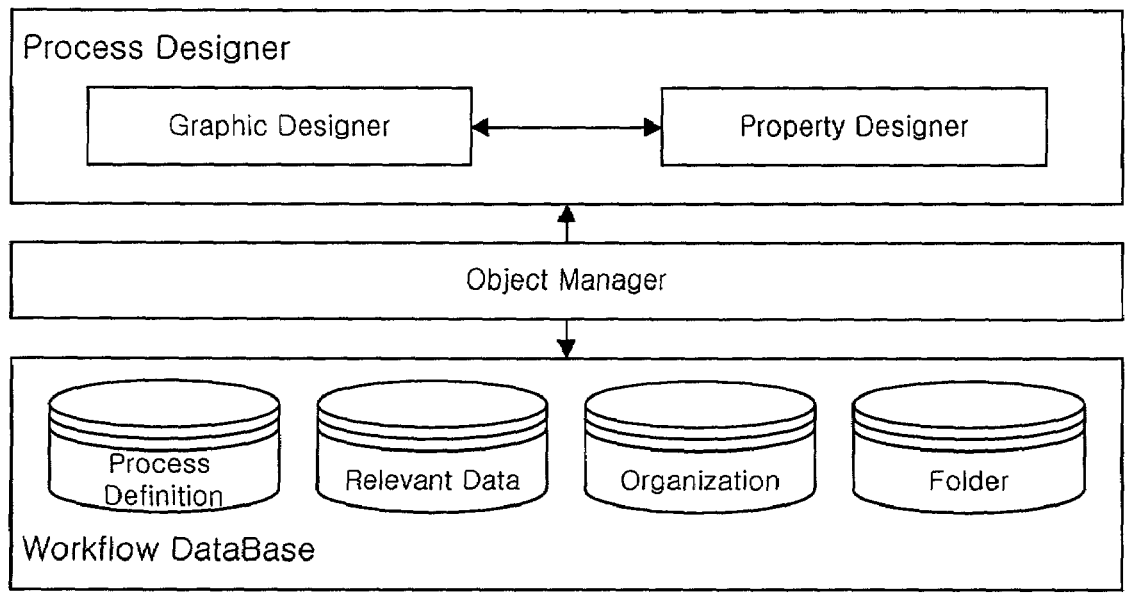
Fig. 5 Web Client
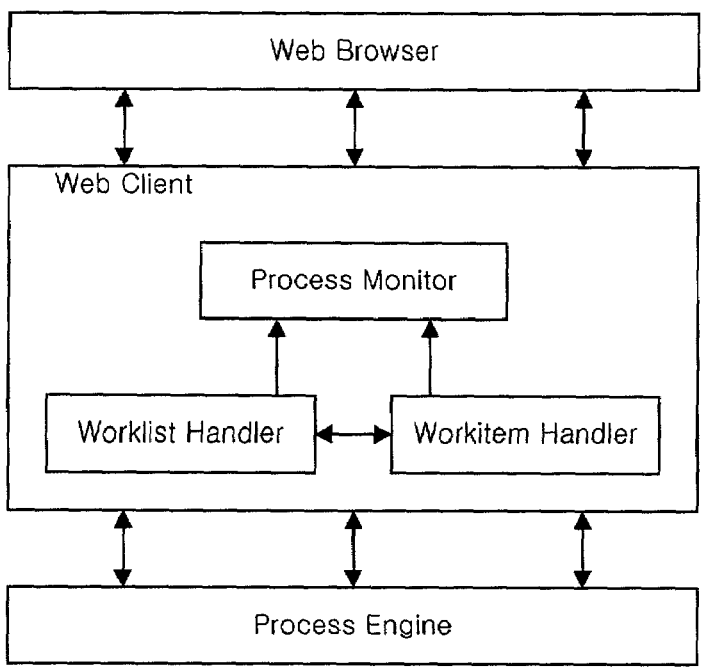

Fig. 6 Form ( Electronic Form Generator )
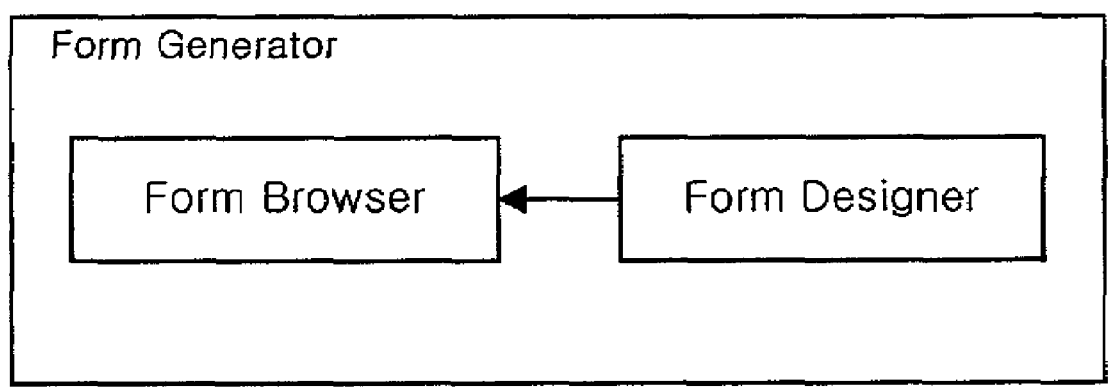

Fig. 7 Flow Chart of Operation of Workflow Management System
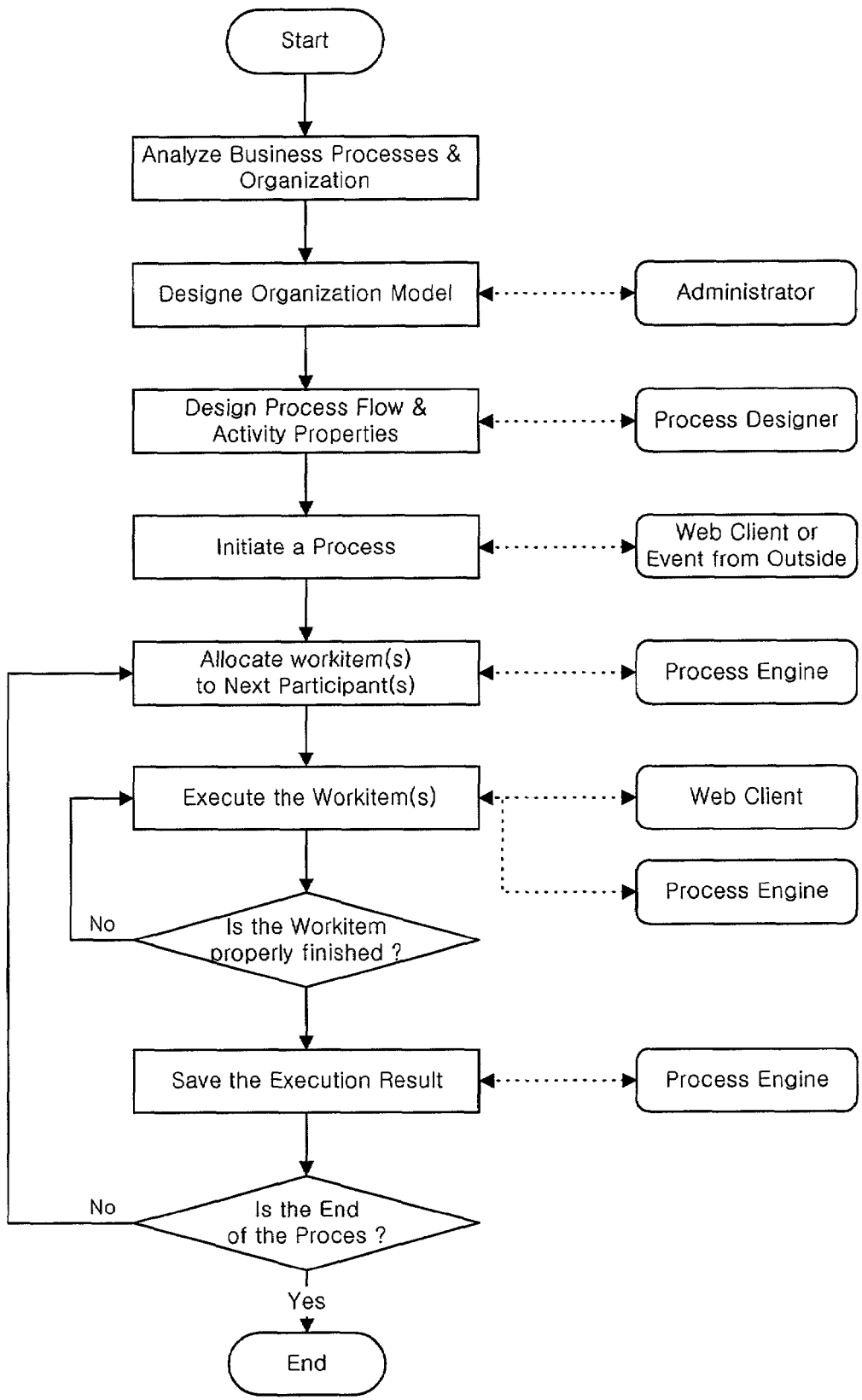

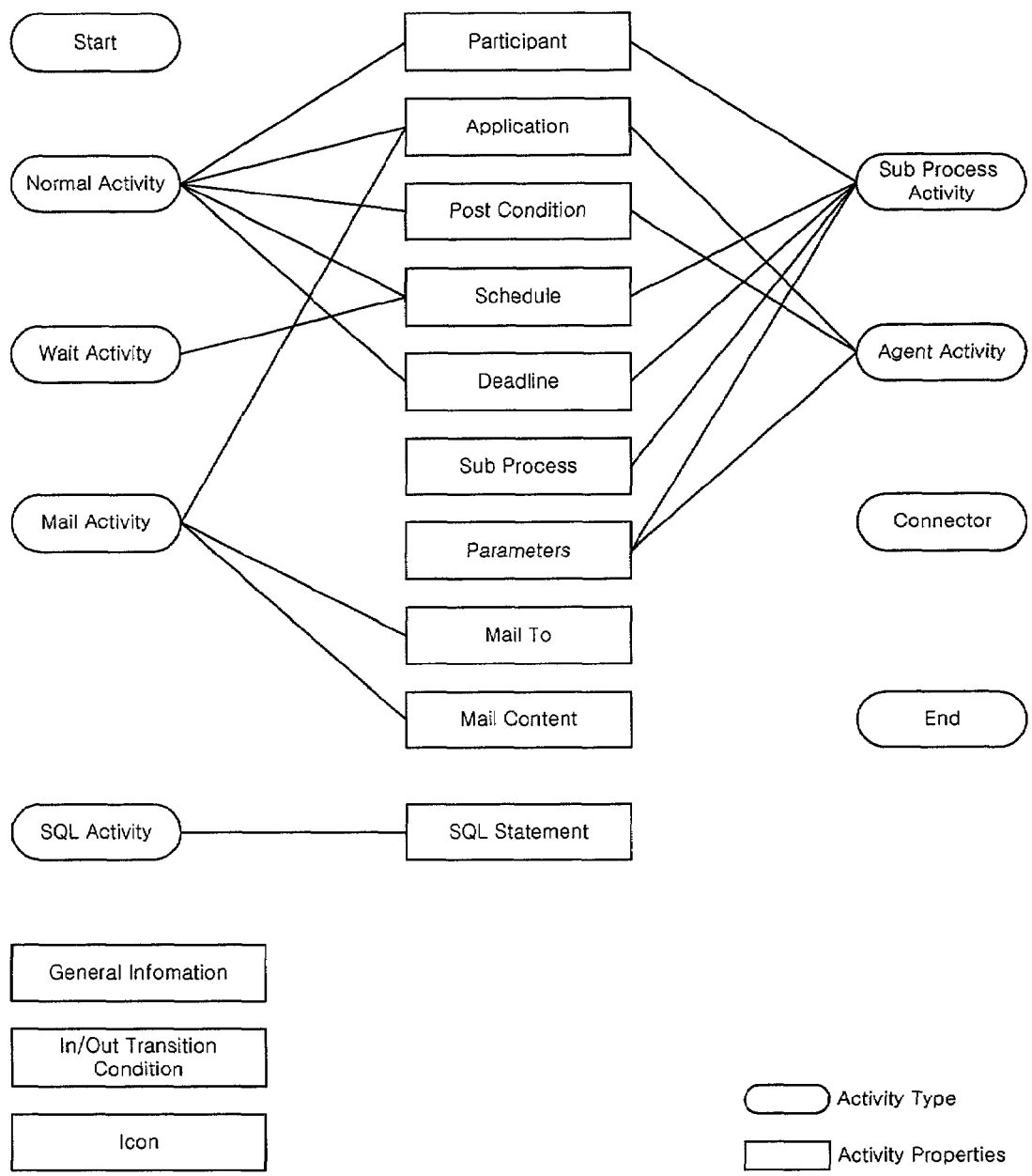
Fig. 8 Activity Type and Properties

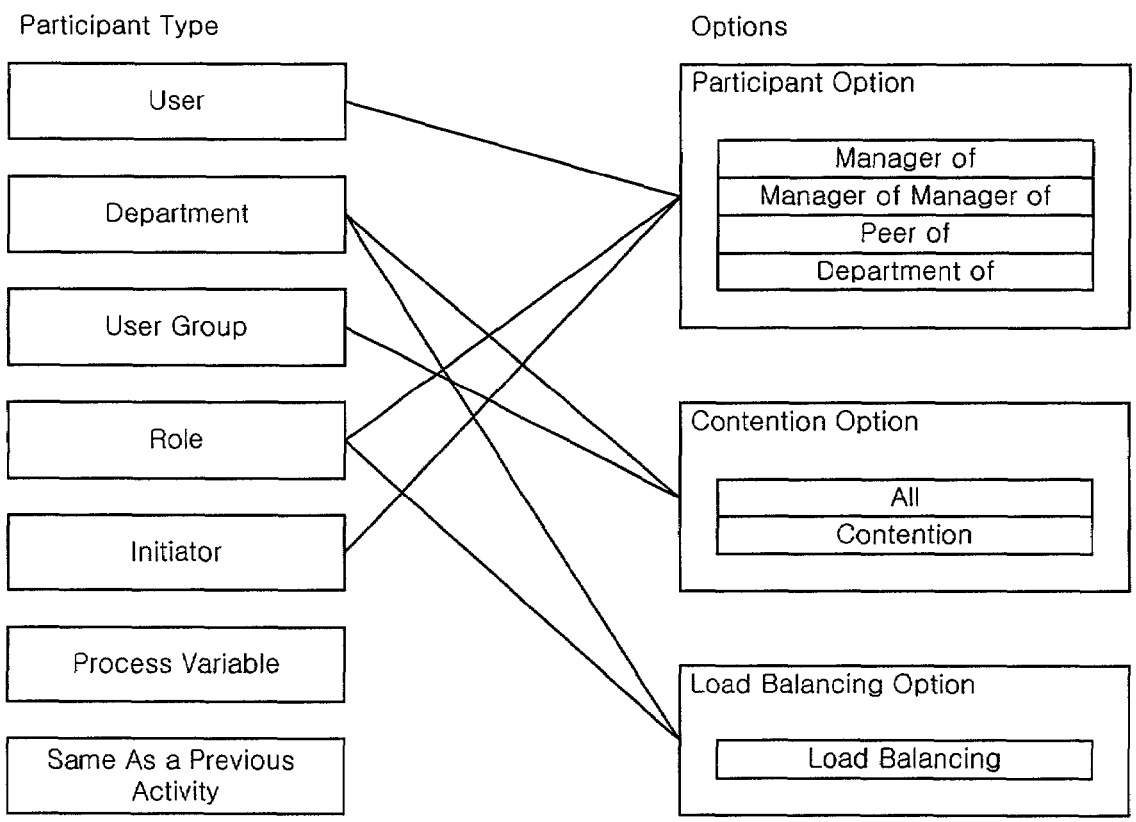
Fig. 9  Participant Type and Options

Fig. 10 Deadline Type and Alert Information
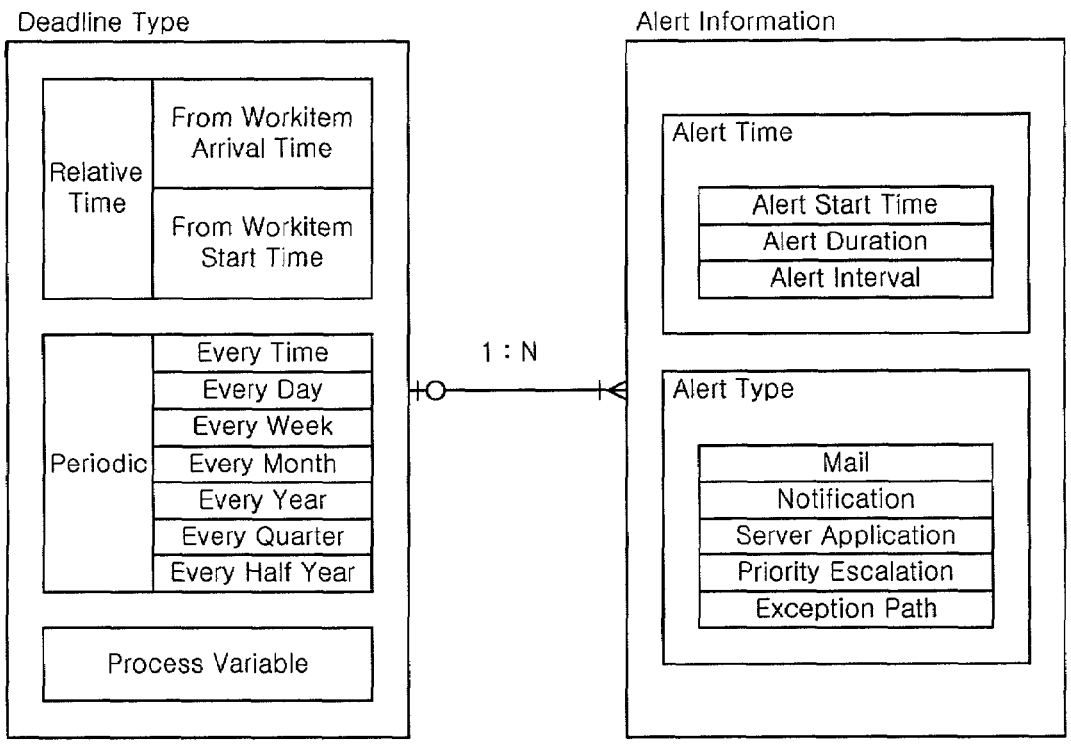
Fig. 11 Sub Process
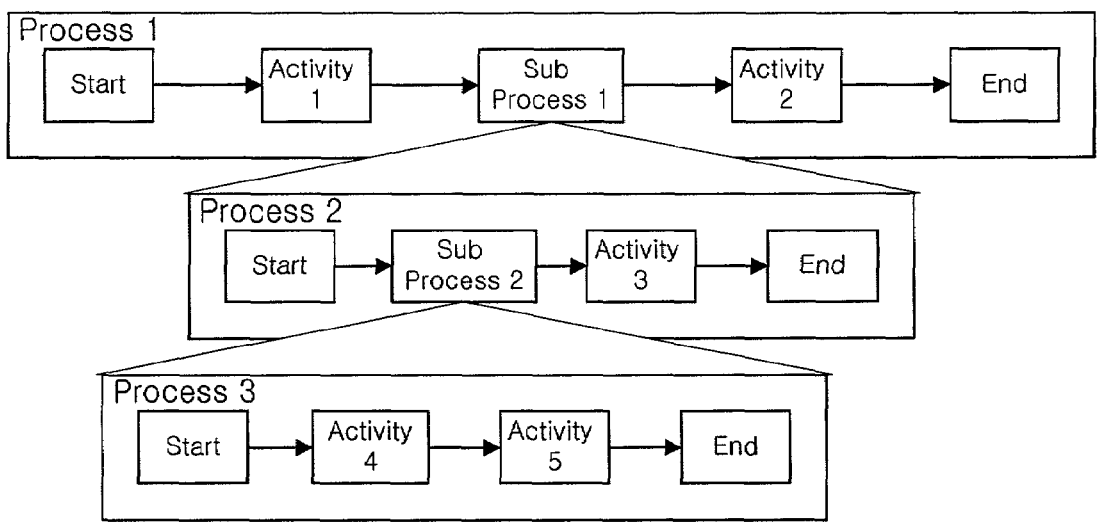

Fig. 12 Synchronous Sub Process Option
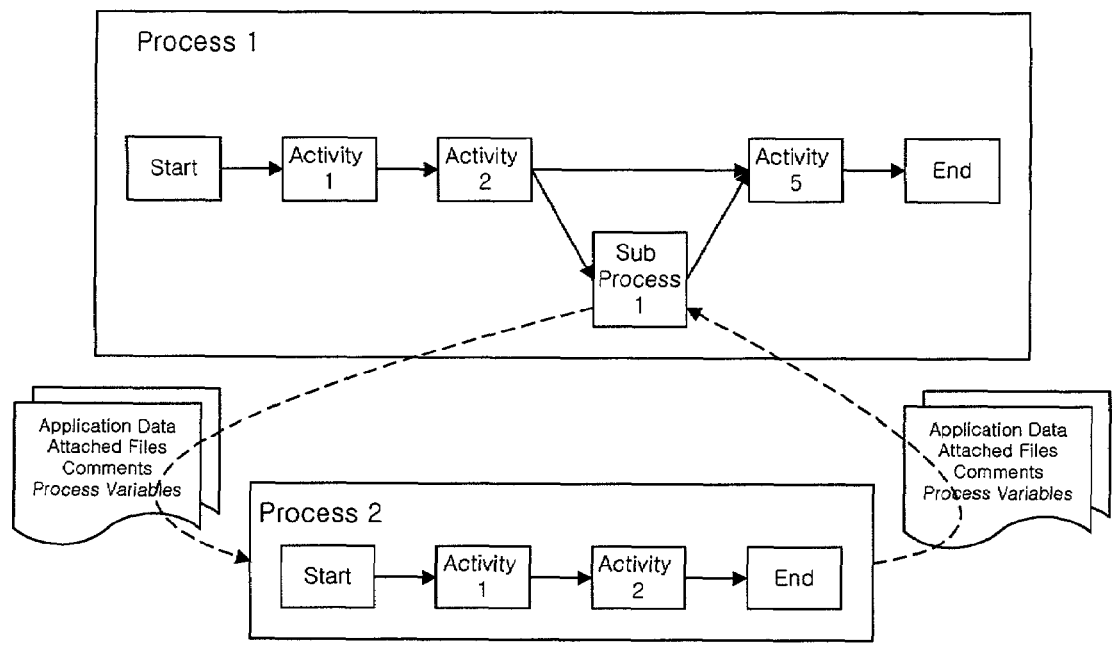
Fig. 13 Asynchronous Sub Process Option
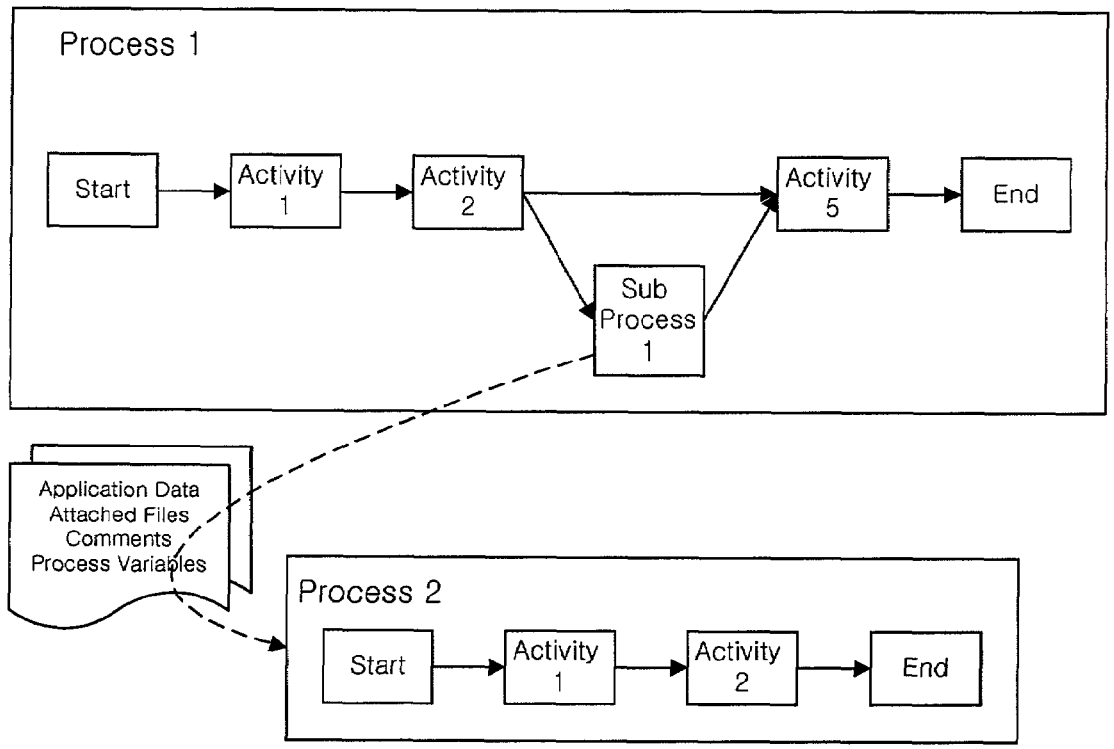

Fig. 14 Process Model Data Locking Mechanism ( Check-Out, Check-In )
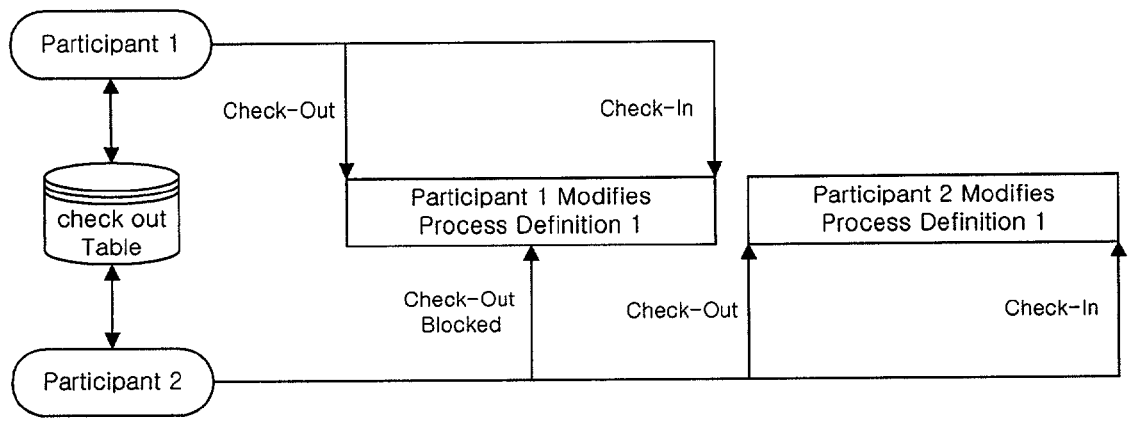
Fig. 15 Exchanging Process Model Data with Other Process Designer
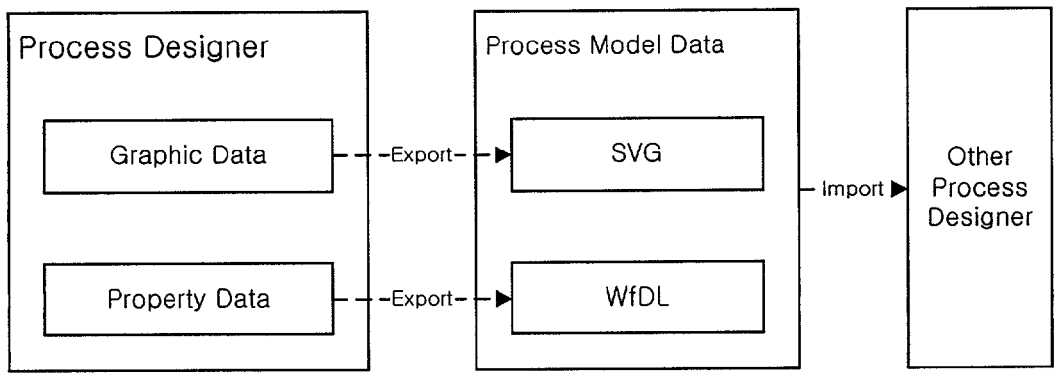

Fig. 16 Process Engine
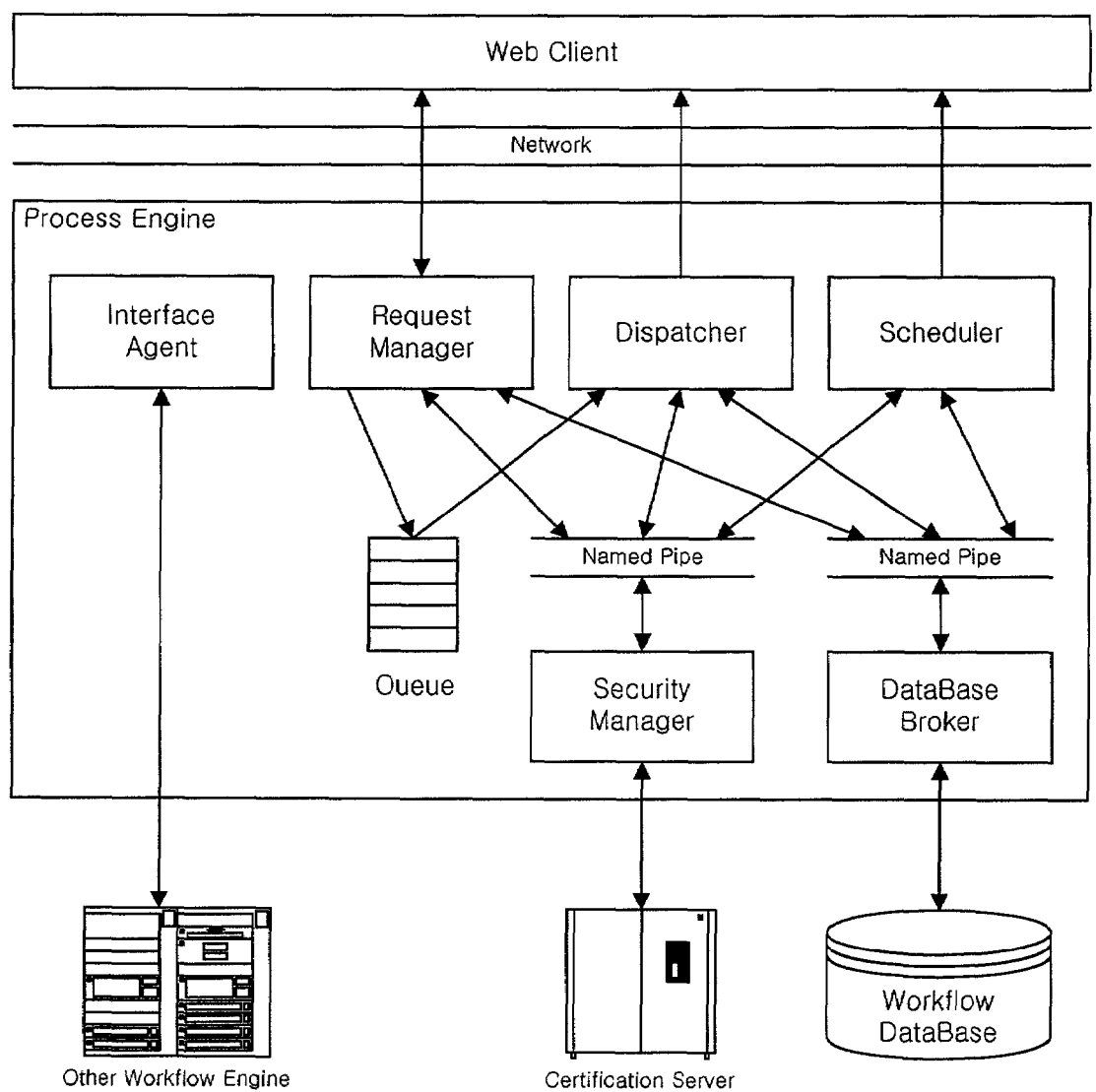

Fig. 17 Activity State Transition Diagram
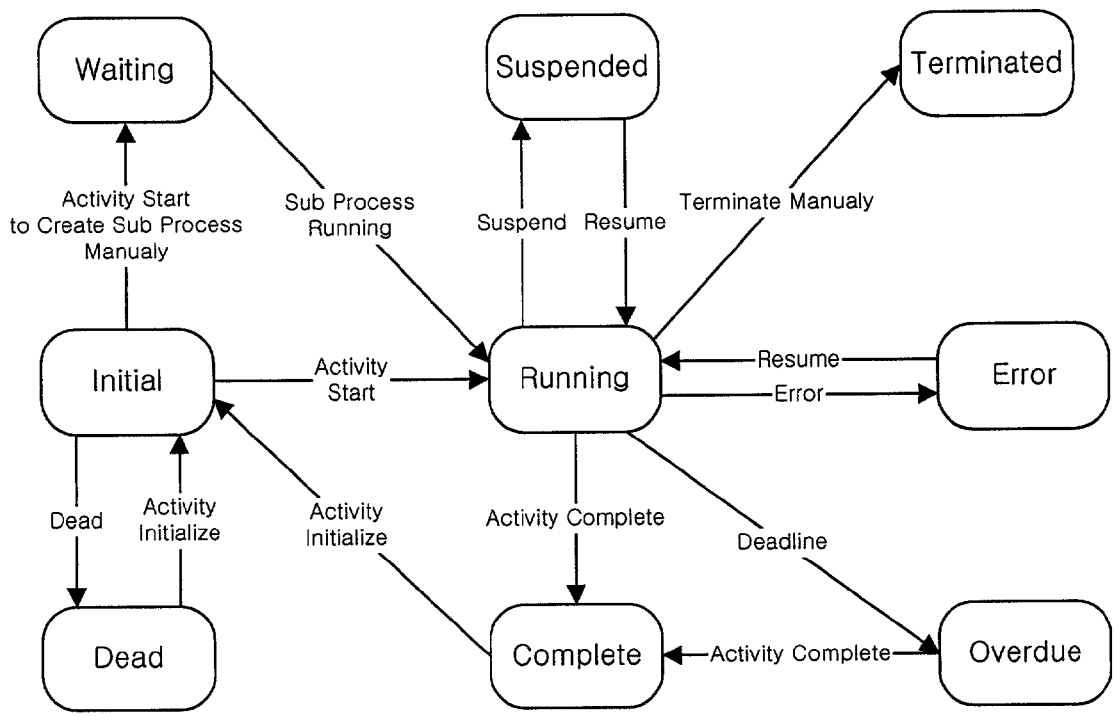
Fig. 18 "Dead" State Example
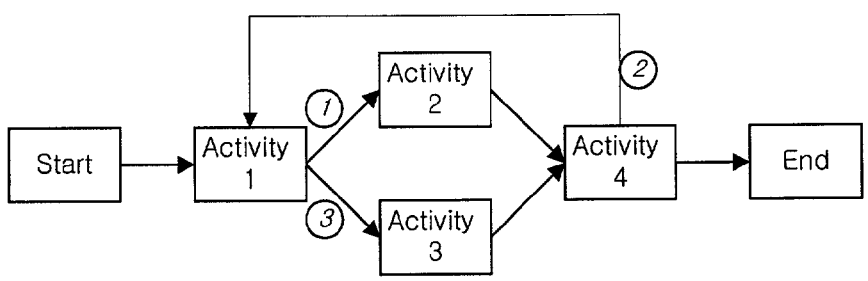

Fig. 19 Example of Merged Flow
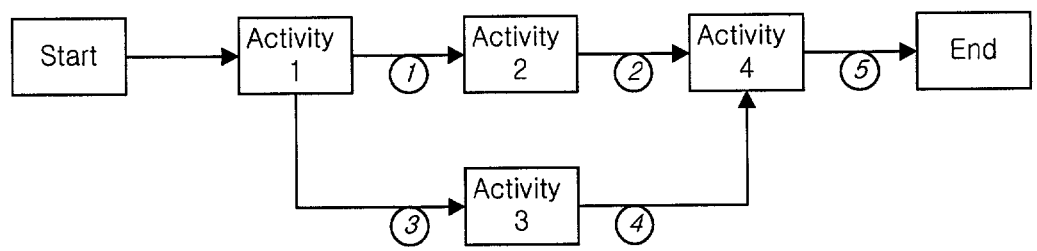
Fig. 20 Dynamic Flow Control Using Transition Count
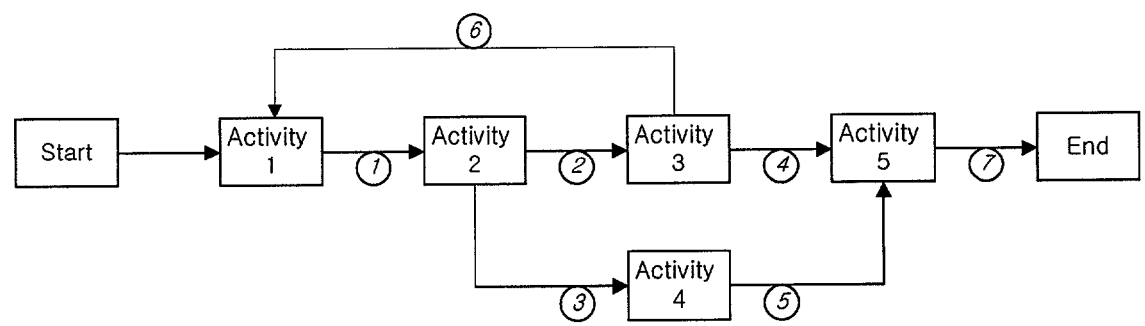

Fig. 21 Application Data Creation
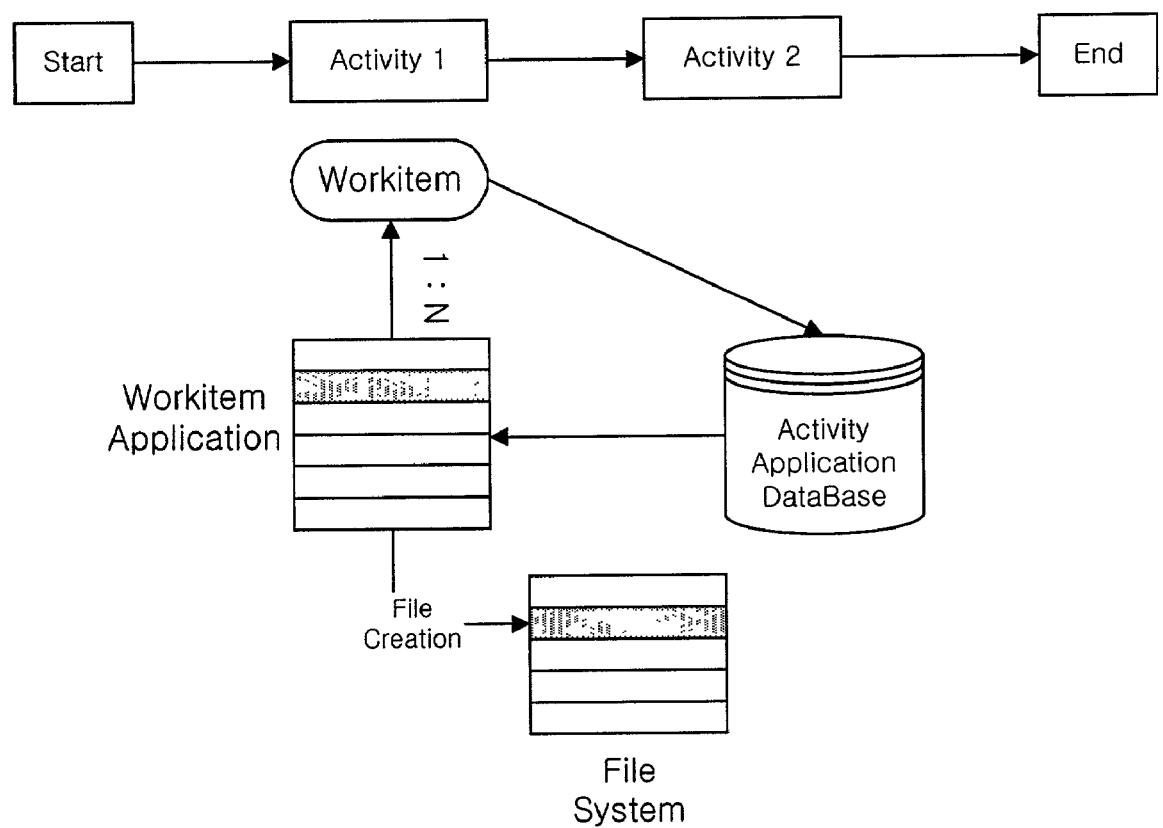

Fig. 22 Sharing Application Data using File Indentifier
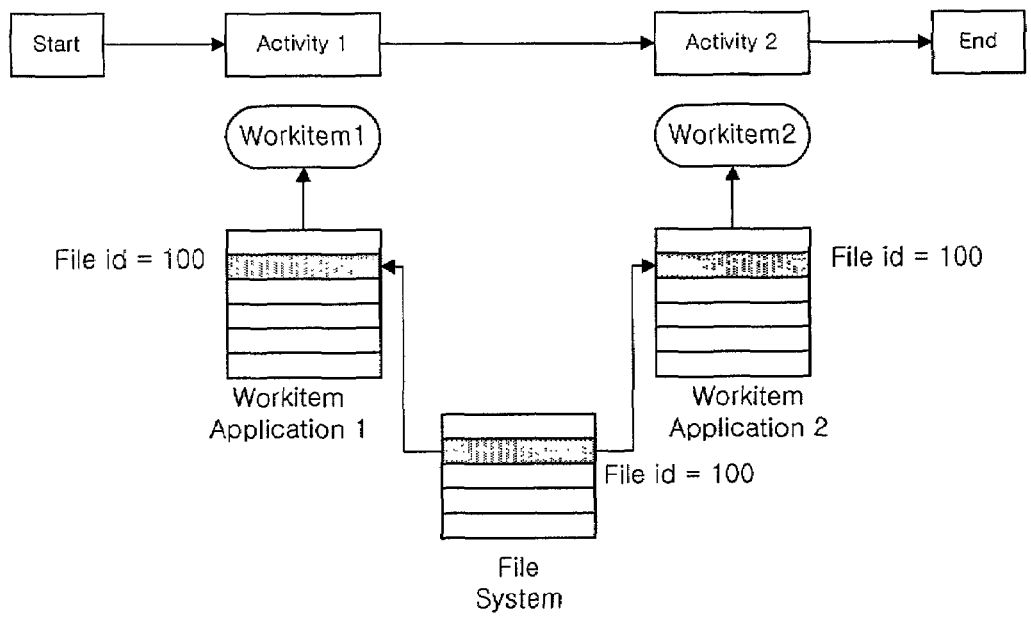
Fig. 24 Workitem Application Locking ( Check-Out, Check-In )
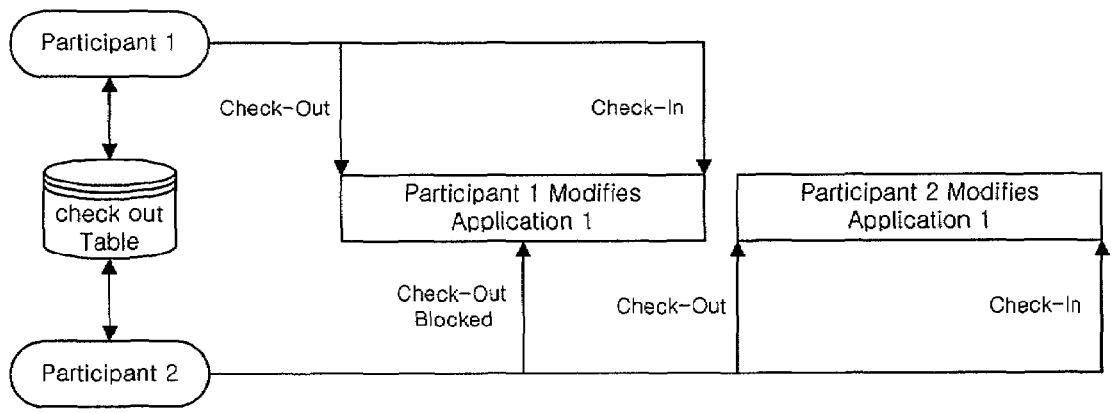

Fig. 23 Business Application Data Sharing Options
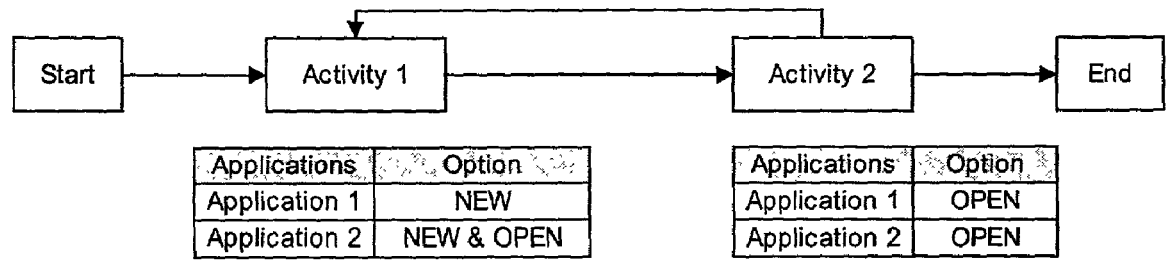

SYSTEMS AND METHODS FOR AUTOMATING A PROCESS OF BUSINESS DECISION MAKING AND WORKFLOW

BACKGROUND OF THE INVENTION (a) Field of the Invention

The present invention relates to systems and methods for automating a business process in various business environments and workflows, including a system and utility device that can help design and implement a business decision making procedure and automate workflow.

(b) Description of the Related Art

In a typical business environment, each business has its own business procedures that vary a lot depending on the nature and type of business where it belongs. Furthermore, the business procedures in the same business change and evolve periodically as new systems and technologies are introduced outside and inside of the business. Therefore, it is not easy to automate the business procedures because it is not easy to categorize the business procedures and make them abstract. Even though a system that can automate certain business procedures is developed, such a system may become obsolete as soon as it is developed, because of rapidly changing business demands and environments. Especially, a system that can be generally adapted for almost every business environment has been far from being developed.

As general computing power of the computer used for business purpose grows exponentially and such business software as word-processor, spreadsheet, scheduler and e-mail programs are widespread, participants in the general business procedures become more computer-oriented. Although widespread use of computers in the business field relieved a lot of people from repetitive simple tasks, however, the introduction of the computer in the job made the entire business procedures more complicated and introduced more dependency on the machines. Furthermore, such dependency on the machines increased the number of people involved in the business procedure and made interactive communications among the participants more difficult, which renders the coordination and supervision of the entire business procedure more challenging.

In order to solve such problems, many attempts to automate business procedure have been made. However, all such attempts have failed to satisfy the ever-changing business demand, because they may not easily adapt to the general business environments.

SUMMARY OF THE INVENTION

The present invention has been made in an effort to solve the above-mentioned problems and to provide a system and method that can automate the business procedures and as well as that can be adapted for almost all the business environments.

It is an object of the present invention to provide a system and a method that can be used for an automation of any business procedures and that can be easily modified as needed.

To achieve the above object, the present invention provides a system that comprises a host computer, an administrator, a web client, a process designer, and a form designer. The administrator controls the whole aspect of the system and the web client is a tool with which the general user works on the system. The process designer defines each process that could be a component of the business procedure. The process designer may define a sub-process, a mail, an agent, SQL query and so on. These activities are basic components of the business procedure. The form designer generates a form that can be used in the business procedure. By using basic templates and modifying them, a user can easily generate a form that he or she wants. The generated form can also embed in the cells such functions as conditional branches, scripts, data exchanges and/or computations.

By composing the system in modules using these utilities, the present invention provides a system and method that can automate almost any business procedures and that can be easily modified without any major overhaul of the system, as demands change.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 1 is a schematic diagram of a business process example;

FIG. 2 is a schematic diagram of the system of a preferred embodiment of the present invention;

FIG. 3 is a schematic diagram of the administrator of a preferred embodiment of the present invention;

FIG. 4 is a schematic diagram of the process designer of a preferred embodiment of the present invention;

FIG. 5 is a schematic diagram of the web client of a preferred embodiment of the present invention;

FIG. 6 is a schematic diagram of the form designer of a preferred embodiment of the present invention;

FIG. 7 is a flow chart of an operation of the automation system shown in FIG. 2;

FIG. 8 illustrates type and properties of the activity and the relations;

FIG. 9 illustrates types and options of the participant;

FIG. 10 illustrates the structure of deadline type and alert information;

FIG. 11 illustrates the structure of sub-process;

FIG. 12 illustrates the operation of synchronous sub-process;

FIG. 13 illustrates the operation of asynchronous sub-process;

FIG. 14 illustrates a process model data locking mechanism;

FIG. 15 illustrates the exchange of process model data with other process designer;

FIG. 16 is a schematic diagram of the process engine in the preferred embodiment of the present invention;

FIG. 17 illustrates the state transition among activities;

FIG. 18 illustrates an example of DEAD state in the preferred embodiment of the present invention;

FIG. 19 illustrates an example of merged flows of business process;

FIG. 20 illustrates a dynamic flow control using transition counts;

FIG. 21 is a schematic diagram illustrating the creation of application data

FIG. 22 is a schematic diagram illustrating the sharing of application data using file identifier in the preferred embodiment of the present invention;

FIG. 23 is a schematic diagram illustrating the sharing of business application data; and FIG. 24 is a schematic diagram illustrating the work item application locking mechanism.

DETAILED DESCRIPTION OF THE PREFERRED EMBODIMENTS

Preferred embodiments of the present invention will now be described in detail with reference to the accompanying drawings.

The whole workflow of the automation system including the steps described hereinafter is generally controlled by a host computer (not shown). The host computer has access to all or at least a portion of the information regarding clients, resources and data. The host computer has information available to the equipments or devices that process the work processes. The host computer can be any kind of commercially available computer system or workstation. In an exemplary embodiment, a Pentium II grade computer with an operating system, such as, for example, Windows NT™, Unix or Linux may be used as a server. It should be understood by one of ordinary skill in the art that the computers and/or the operating systems can be upgraded or interchanged to accommodate the user demands and resource requirements.

Business Process and Definitions

A business process is a series of workflows that have to be executed to achieve a business objective. In one case, the workflows can be executed and finished within an organization. In other cases, interactions among organizations may be necessary. Examples of a typical business process are handling purchase orders in the sales department, lending money in the banking industry and paying the insurance coverage by the insurance company.

A business process has certain characteristics. As shown in FIG. 1, a business process has a starting point and an ending point. For example for a sales department, a business process may start by generating a purchase order and ends by delivering the goods. Also, a business process comprises a couple of activities which are performed in a logical order according to a business rule.

The activity in the business process is typically associated with a participant, an application and a business rule. The participant actually handles the activity and can be an individual, a department or a group of people. The application is a tool that the participant uses to execute and finish the activity. The business rule guides the flows of activities and determines if the activity is finished and selects the following step when finished. The application can be any office program. It can be a word processor, a spreadsheet or a database program that are commercially available in the market.

Examples of business rules are conditions for completing an activity, a deadline for an activity and a transition condition that determines the following activity in the process.

The workflow management system of the present invention enables people to easily automate the business process and support to model and execute a business process, which can be a complicated process. The system of the present invention automatically allocates the activities to the participant and allows a user to view the work lists. The system can also provide a common environment for each different application such that the user can perform the activities more effectively. In general, therefore, the system of the present invention can increase overall productivity by reducing the work processing time and the errors that may occur in the process.

Architecture of System

As shown in FIG. 2, the preferred embodiment of the present invention has two stages. The first stage is a modeling stage and the second stage is an execution stage.

The modeling stage analyzes the business matter and designs a business process to be used in the workflow management system. As shown in FIG. 2, the modeling stage uses the administrator and the process designer, which interact with the database and the application programs.

The execution stage actually performs the activities in the business process as designed in the modeling stage. In the execution stage, the process engine executes activities by interacting with the database, business application programs, the worklist handler, the workitem handler and the process monitor.

The administrator maintains the organization and the member information related to the business process. The administrator also creates and maintains the information on the members' authority, the role and group used in the business process. Further, it controls and maintains the business application program.

The process designer is a tool that models and designs the flows and properties of the business process.

The process engine actually executes the business process. The engine automatically allocates the activities to proper participants, notifies the start and end of activities, stores the results of the finished activities, manages the security and interfaces with other workflow engines.

The database is a repository that stores the modeling information on the business process and the result of activities executed by the process engine.

Web Client provides services necessary for participants to manage their work list, to execute their works and to monitor the status of the current process. Using these services, participants can handle their works on the standard web browser such as Microsoft Explorer™ or Netscape™. As shown in FIG. 5, Web Client has a couple of components.

The worklist handler maintains the list of works allocated to participants or individuals by the process engine. It can manage and manipulate the works by retrieving, sorting and forwarding them.

The workitem handler is used in executing activities. It can automatically execute necessary application and attach files and comments. It may also perform electronic signatures.

The process monitor enables the user or the system administrator to monitor on the real time basis the on-going or finished business process and the history of the process.

Forms and the business application program are application programs that are required in executing a business process. The required electronic forms and business application programs are listed in the database in the modeling stage. The process engine executes the forms and other business application program based on the information listed in the database. Present invention includes a form generator that can design and operate the various electronic forms related to the business process.

FIG. 3 describes the administrator in more detail. The administrator comprises an organization manager, a role/group manager, an authority manager, a process manager, and a folder manager. An object manager interfaces the administrator with the database. The administrator can retrieve and store information from the database.

The administrator maintains the organization and its member information, the members' authorities. It also creates a role and a group in the organization and controls the business application program.

Organization manager designs and manages the company's organization and structure. The members of the organization handle business process. A typical organization is usually structured hierarchically. Within a hierarchy, there may be different ranks. Business process may dictate a rank rather than an individual member to handle activities. Therefore, the workflow management system needs a tool that can set up and modify the organization structure.

Organization manager can create an organization chart. It can create and delete a department, input and edit relevant information on the department. Organization manager sets up and manages the relationships between a higher ranking department and a lower ranking department. It also manages the members in the department. For example, it can create, edit and delete a rank of the members in the department. The organization manager also handles the members' information. When members are absent, the organization manager sets the absence period and elects a delegate that can handle the activities until the absent member comes back. The organization manager can also register and manage the members' signature.

The role and user group manager generates and maintains the role and the user group in the organization. An individual may have a role to play in the organization. The role can be the responsibility of the department that the individual belongs to or to the entire organization. A role of a secretary, a role of an office administrator, and a role of teller are examples.

A user group is an ad hoc department that works as task force team. A member in a user group is also a member of his or her own department but is working temporarily for the user group.

An active organization may have tons of various roles and user groups. Furthermore, these roles and user groups are very dynamic as business develops and as the organization grows bigger. A role and user group manager generates and maintains such dynamic roles and user groups.

In other words, the role and user group manager defines a new role and allocate it to an appropriate member of the organization. It sets up a new user group and assigns the member to the new group. It can also edit and delete the existing roles and user groups.

An authority manager generates for and allocates to an individual member an authority to access and handle a business process. The participant in the business process, such as a role, a department, a user group, or an individual member of the department or organization, has an authority to access a business process and the related business application programs. The business rule associated with the business process determines which participant has an authority to access what business process and business application programs. When the business rule is set up in the early modeling stage, the authority manager generates a new authority group and allocates an individual member, a role, a department or a user group to the authority group. The authority manager can also edit and delete the existing authority group.

A folder manager generates and manages a folder that may contain information on business process. It is quite convenient and necessary to control and mange in the same folder all the information from the same business process, such information as on business process definition, process instances and the execution results. It would be also helpful if the well-organized folder is connected to the authority group to allocate the necessary authorities for a certain business process to the business process folder.

The folder manager can create a new folder and create a lower level folder in the new folder. It can also edit and delete the existing folder and assign an authority group to the folder and the objects contained in it. It can further set up an authority of the authority group assigned to a folder.

Process manager is another component of the administrator. Once the folder manage creates folders for process definitions, process instances, process archives and business applications, necessary information are stored in each folder. Process definition folder stores information on the process model created by the process designer. When the process definition is executed, the process instance folder stores the results of the execution. Information on the executed process is stored in the process archive folder. Applications necessary for creating and executing the process definition are stored in the application folder. Process manager traces and maintains such information.

Among the function of the process manager, it creates, retrieves, changes and deletes process definition, process instance, process archive. The process manager calls the process designer when it creates and changes the process definition. The process manager can also list, retrieve, change and delete the business applications. It can start, suspend, resume and terminate the process, too. The process manager can change the value of the process variable and may retrieve and monitor the detailed information on the on-going or finished business process.

The administrator also has an object manager. The object manager creates an object for modeling a process. It receives a data process request from the process designer and processes them. The results are sent to the database.

FIG. 4 shows a schematic diagram of a process designer of the preferred embodiment of the present invention. The process designer designs the flow of the business process and defines each activity that is performed in the process. The process designer comprises a graphic designer and a property designer.

The graphic designer is a tool that draws the business process using a node and an arrow. A node represents an activity and an arrow represents a transition. Activities are jobs that have to be done in the business process. Transitions indicate the flow of such activities. Users can simply drag and drop the nodes and arrows from templates and can easily design and model a complicated business process.

The property designer defines each activity. When the flow of business process is designed, each activity in the process has to be defined in detail. Property designer assigns to the activity the participant that executes the job, the business application programs that are to be used to do the job, the deadline by which the job has to be finished, and the conditions that determine the path of the business process after finishing the job execution. The conditions can be a conditional branch and be represented as in-out transition paths.

The property designer enables the user to design and define the business process and its components under a user-friendly interface without huge efforts.

The process designer retrieves organization information necessary for process modeling from the organization database. The model data generated by process modeling are stored in the process definition database. The information on the storage and the execution paths of the business process is stored in the folder database and other related information, such as process variables that are necessary for interchanging data among applications, is stored in the relevant database.

The object manager interfaces the process designer and the database. For this purpose, the object manager generates an object for process modeling and receives data process request from the process designer and processes them and sends them to the database.

Now, referring to FIG. 5, a web client that interfaces with individual user is described. FIG. 5 shows a schematic diagram of the web client. Web client allows the user to maintain the worklist, manage the work environment and monitor the work process. The user can interact with the system through a standard web browser such as Microsoft Internet Explorer™ or Netscape™. The web client comprises a worklist handler, a workitem handler and a process monitor.

The worklist handler is a tool that can manage the list of works assigned to each individual. Each user can retrieve and manipulate the worklists and may forward the list to others. The user can monitor the progress of the works on his worklist through the process monitor.

The workitem handler is used in executing the work process. It can automatically execute the process and provide other supports necessary for executing the processes.

The workitem handler executes the business application programs necessary for the work process and displays them on the screen. When necessary, multiple applications appear on the screen and can be selected by tabs. When the user enters all the necessary information and selects to finish the work, the workitem handler stores the information and finishes the work. When the user wants to save the unfinished work, the workitem handler stores the most current status of the work. Workitem handler may attach a file or comments to the work and pass it to the next user in the workflow. Attached files and comments are accumulated and stored together with the information of the executed work, even after the work is finished.

For security purpose, the workitem handler may use electronic signatures and request certification from the outside certification server. It can print out the contents of the application program that is being used. The user may use the workitem handler to select the path for the next work process according to the business rule.

Process monitor is a tool that can monitor the progress and status of the business process. It helps the user to easily figure out the progress of the process model in graphics. The process monitor also provides detailed information on the workers, processing time and the status of the previous work process.

FIG. 6 is a schematic diagram of Form Generator. Form generator comprises a form designer and a form browser. Form generator creates an electronic document and displays it. It supports the various kinds of graphic objects, data input cells, graphic signatures, automatic calculations, database access and programming scripts to help the user create different kinds of forms and application programs for the organization.

Form designer designs and creates electronic documents and applications that are necessary for the work process. The form designer has graphic objects that can represent and design the forms of documents and applications. The documents and forms are easily drawn using various line arts, data input cells, labels, tables, buttons, list boxes, combo boxes, radio buttons, check boxes, bar codes and signature cells.

The form designer also supports the standard database access protocols, such as Open Database Connectivity (ODBC) and Active Data Object (ADO), so that the data input through the documents can be interchanged with the database.

The form designer also provides a script editor for application program or for implementing the business logic. The script editor may also contain Application Programming Interface (API) in order to synchronize the workflow with the application programs.

Form browser allows browsing the documents created by the form designer. Using the form browser, user can input data and store the results of the execution. The user can retrieve necessary data from the database and add and change data through the form browser. The user can also put a memo on the form using the form browser and put signature on the electronic document using an electronic pen or a mouse. When necessary, the user may put a digital signature after getting a certification from the external certification server.

Operation of Workflow Management System

Now, referring to FIG. 7, an operation of a workflow management system of the preferred embodiment of the present invention is described.

In order to model a business process using a workflow management system, the applicable business processes and the related organization need to be analyzed first. At this stage, people should collect the information on the related department, members, roles and user groups and analyze them to figure out their functions and authorities in the business process. Each work item and necessary resources for finishing the work item at each step of the business process and relevant business rules for each work have to be analyzed.

After analyzing the business processes and the organization, a workflow system is modeled based on the information gathered during the previous step, using the administrator. At this stage, the information on the departments, members, their titles and roles are compiled in the workflow management system. Then, the roles and the user groups are mapped to the department and its members. An authority group is formed and is mapped to the relevant department, role, user group and members. Folders are created for business processes and business applications. The process manager lists business applications that are necessary for executing each business process.

The next step is designing the business process flow and activity properties. After modeling the organization and the resources for the business process, each business process is modeled. First, necessary activities are chosen for each work in the process by dragging and dropping graphic icons in the graphic designer. Each activity is connected by transition according to the business flow. Using the property designer, properties are assigned to the activities and the transitions according to the business rule.

After modeling the process, the user may initiate the process through the web client. The process may be initiated by an outside event.

Once the process is initiated, the process engine allocates the workitems to the next participants according to the business rule and notifies them. The participant can be assigned when modeling the business process or can be assigned dynamically according to the business rule.

The workitems are executed, when it reaches the participant. The participant views and executes the allocated workitems through the web client. In an automatic mode, the process engine calls the necessary application and executes the workitems.

When the workitems are normally executed, the process engine stores the results in the workflow database and proceed to the next step after checking the end of the process.

Such a workflow management system as the preferred embodiment of the present invention is very useful in implementing and automating the web based transactions and e-commerce system.

Activity Types and Properties

From now on, activity types and the properties are described. FIG. 8 illustrates the activity types and the properties that can be associated with the activity types.

A business process has many different kinds of activities, such as data input and output, sending e-mail, sending notification and executing software program. In order to model and design the business process more effectively, a workflow management system must be able to create, manage and support various kinds of activity types and properties.

As shown in FIG. 8, the preferred embodiment provides various kinds of activity types that can represent jobs in the business process and the properties that can be assigned to each activity. The activities and properties are exemplary and not limited to those explained here. More activities and properties can be defined and created as business environment changes. The preferred embodiment provides a tool having a friendly graphic user interface that can easily define and create such activities and properties. Detailed explanation on the activity types and properties follows.

Start: start activity means the beginning of the process. Any user initiation or an application program intervention is not necessary.

Normal Activity: any activities that involve a participant's intervention are normal activities. Various kinds of activities can be a normal activity, depending on the participant and the application necessary for executing the job. Data input and signatures are typical examples of the normal activity.

Wait Activity: in a business process, wait activity dictates to wait for a certain period of time or until a certain event happens. Examples are waiting for 10 minutes after finishing the previous job, or waiting until other job is finished when the business rule mandates that the next step cannot start until the other job is finished.

Mail Activity: a business process may require sending e-mail automatically. The sender, main recipient and copy recipient as well as the content of the mail can be defined dynamically by setting variables for this activity.

SQL Activity: SQL activity accesses the application database automatically when mandated by the business process. SQL activity can edit, add and delete data by using standard SQL languages.

Sub-process Activity: when more than one business processes are connected together, or when simplifying complicated business processes and representing them hierarchically, a series of separable activities are combined together and represented as one business process. Sub-process activity enables separate and complex activities to be bundled and be represented as one activity to simplify the process model.

Agent Activity: agent activity automatically activates a program in the server or somewhere else without a participant's intervention. For example, a program that can automatically pay wages for the worker based on the work hours and associated expenses when the worker finishes the job can be placed after the work process. In this case, an agent activity that automatically executes the payroll program may follow a normal activity that inputs the worker's work hours.

Connector: connector simplifies a plurality of complicated transition in a big and complex business process model. A connector may be also used in assigning the same condition to a group of plurality of transitions.

End: end activity represents the end of the process. When the process reaches end activity, the whole process ends.

In addition to the activity types, FIG. 8 shows properties that represent the functions and business rules associated with the activity types. The process designer of the preferred embodiment of the present invention provides an effective tool that can assign properties to each activity. Followings are the examples of the properties.

Participant: participant describes the information on the individuals that execute the job. Participants can be an individual, a role, a department and a user group. Various kinds of options can be assigned to the participant in order to attach business rules in more detail.

Application: application is a business application program that a worker works on. A word processor or a spreadsheet program and a software program that is automatically executed by the system are examples. The process designer may assign to an activity an application out of the pool of applications registered in the entire workflow management system.

Post Condition: post condition determines when the activity finishes. The post condition is used to determine if the worker in a normal activity or the program in an agent activity finishes the activity. Post conditions can be represented by the data value generated from the application, the number or percentage of the participants in the activity, the answer from the participants, or the combination of these all. When post condition becomes complicated, a separate program may be used.

Schedule: schedule describes the planning of the activities and works. The schedule may designate expected work-hour and wait period.

Deadline: deadline puts the time limit when the job has to be finished. It can issue various kinds of warnings regarding the deadline.

Sub-Process: sub-process can assign an actual process to the activity represented by the sub-process activity. It can also define the property of the actual process.

Parameter: parameter defines the parameter value that is necessary for executing a program in the agent activity.

Mail To: mail to determines the recipient of e-mail in the mail activity. The recipient can be assigned by e-mail address or by using an organization chart. When the recipient changes depending on the business situation, the recipient can be designated as a process variable and can be dynamically allocated.

Mail Content: mail content represents the contents of e-mail in the mail activity. Portions of mail content can be designated as a process variable and be changed dynamically.

SQL Statement: SQL statement is used for the SQL activity and supports the standard SQL language.

General Information: general information shows the names and the descriptions of the activity. It is applied to all the activity types.

In/Out Transition Condition: this represents conditions for an input transition that is used to begin an activity and for an output transition that indicates the following workflow steps after finishing an activity. The conditions can be represented by the data value of the executed application, by the number or the percentage of the participants or workers involved, or by the answer from the participant. More complicated conditions may require a separate program for setting up conditions.

Icon: it can designate the shape of each activity type.

Among activity properties, the participant designates the person who executes the activity. The activities can be performed by varieties of members as the business environment changes. Therefore, it is necessary for the workflow management system to support that the person that executes the activities can be designated in many different ways.

FIG. 9 shows the participant types and options that the process designer of the preferred embodiment of the present invention provides. The types and options are not limited to those listed here, but simply exemplary types and options. The types and options can be extended and created more as the business environment changes.

User: user represents a person that actually performs the activity. It can be selected directly from the organization chart.

Department: department is used when the activity is executed by the department. Department can also be selected directly from the organization chart.

User Group: it is used when a user group performs the activity. The user group can be selected from the pool of user groups defined by role/user group manager.

Role: it is used when a person with such a role performs the activity. The role can be selected from the pool of role groups defined by role/user group manager.

Initiator: it is used when the person who initiated the process must perform the activity.

Process Variable: it is used when the person who will perform the activity changes dynamically according to the result of the previous activity. By designating the participant as process variable, different participant can be allocated for the activity depending on the result of the previous activity.

Same As a Previous Activity: it represents that the participant that performed a certain activity is required to perform the present activity. Once a participant is designated to one of the activities, the participant becomes automatically designated to the other activities.

In addition to the participant types, the process designer of the preferred embodiment of the present invention can assign a participant an option. Participant options are assigned to the participant of a user type, a role type and an initiator type. Followings are the options that can be assigned to the participant.

Manager of: it designates the manager of the designated participant as a person to perform the activity. Evaluations of employees can be an example.

Manager of Manager of: it designates the manager of the manager of the designated participant as a person to perform the activity.

Peer of: it designates the colleagues and peer of the designated participant as the person to perform the activity. Department of: it designates the department of the designated participant as the person to perform the activity.

In the options of "Peer of" and "Department of", the job title and the role can be additionally designated.

Contention options can be also combined with the participant options. When a plurality of participants are involved in the activity, the contention option determines when the activity is finished. The contention option can only be associated with the department type, the user group type. Followings are explanations of contention options.

All: the activity is assigned to all the members in the participant and all the members in the participant have to finish the activity.

Contention: the activity is assigned to all the members in the participant but if one member finishes the activity, the activity is removed from the other members' list.

In addition to that, Load Balancing option can be associated with the participant. When allocating an activity to a plurality of participant, the load balancing option assigns the activity to the participant with the least workload. The number of activities that the participant has to work on can measure the workload.

Deadline and Alert Information

The process designer may set deadline and alert in the business process. Usually, business process has a deadline and the worker needs to be alerted as the deadline approaches. The property designer of the preferred embodiment of the present invention can set a deadline on the activities that participants work on and alert the participants when the activities are not finished or may not be finished by the deadline.

Such deadlines and alerts need to be able to set in various formats according to the business rules. FIG. 10 shows different types of deadlines and alerts. Each deadline type can be combined with multiple alert information. Followings are the explanations on the types of deadline and alert information.

First is a relative time type. This type sets a deadline by calculating a relative time period from the time when the activity was first started. It can designate the deadline by days, hours and minutes. For example, a deadline can be set as one day four hours and thirty minutes after the activity reaches the participant.

It has two sub-options. One is since the activity arrives and the other is since the activity starts. The first option starts the calculation of the relative time from when the activity arrives and the second option starts the calculation of the relative time from when the activity is started by the participant.

Next is a periodic time type. It is convenient to set up a periodic time deadline for an activity that occurs periodically. Periodic time type deadline has following options;

Every Time: deadline can be set every hour and the specific minute can be designated.

Every Day: specific hour and minute of everyday can be set as deadline.

Every Week: a day, hour and minute of each week can be set as deadline.

Every Month: a date, hour and minute of each month can be set as deadline.

Every Quarter: a month, date, hour and minute of each quarter can be set as deadline.

Every Half Year: a month, date, hour and minute of each half year can be set as deadline.

Every Year: a month, date, hour and minute of each year can be set as deadline.

In some instances, the deadline for the business process may vary depending on the circumstances. The process designer allows the deadline to be dynamically determined by assigning a process variable to the deadline.

As deadline approaches, alert time sets the time when it notifies the participant or the relevant people of delays of the activity. Alert time can be set by Alert Start Time, Alert Duration and Alert Interval, as shown in FIG. 8.

Alert Start Time is the time when the activity delay is first notified to the participant and the relevant people. Alert Duration determines the period for which the participant is notified, starting from the Alert Start Time. Alert Interval is an interval between one alert and the subsequent alert.

Alert may have different types, depending on the method of notifying the delay and the measures taken when the activity is delayed.

Mail: this alert type may send e-mail to the participant or to a relevant person designated by the process designer.

Notification: a special message can be sent to the designated participant or relevant person to notify the delay of activity.

Server Application: a special application can be executed to take a special step when the activity is delayed.

Priority Escalation: a priority of the process can be increased every time the alert is issued.

Exception Path: a different path from the regular transition path is taken when the deadline is passed.

Sub-Process is used to simplify, model and design a complex business process. In most organizations, business processes are designed and managed in a hierarchical manner. Hierarchical design and structure have an advantage in easy analysis and implementation. They can be easily adapted as the business environment changes and also provide independent responsibility and authority.

Sub-Process of the preferred embodiment of the present invention enables the user to design and implement such a hierarchical business process and to maintain consistence between the higher hierarchy and the lower hierarchy by sharing information among the hierarchies.

FIG. 11 shows an example of modeling a business process by using a sub-process. Each process can be independently designed and implemented. Such processes are combined under parent-child relationships by using the Sub-Process activity. When the workflow in the business process reaches the sub-process activity, it activates the child process.

In the Sub-Process activity, general information defines the activity name, description and the child process to be connected. General information also designates the execution path and the storage path for the child process.

The Sub-Process can be initiated manually or automatically. In the manual option, the participant assigned to the sub-process activity initiates the sub-process manually, when the workflow reaches the sub-process activity. Under the automatic option, the related child process is executed automatically when the workflow reaches the sub-process activity.

The information between the parent process and the child process can be exchanged in many different ways.

Application option determines if the application data are exchanged between the connected two processes. Attached file option determines if the attached files are exchanged between the processes connected. Comment option determines if the connected processes exchange the comments. Process variable option determines if the connected processes share the process variables and exchange the values via parameters.

Sub-Process can be executed either in a synchronous manner or in an asynchronous manner. FIG. 12 shows a schematic diagram of a synchronous option for a sub-process activity. Under the synchronous option, when the workflow of the parent business process reaches the sub-process activity, the child process is executed. After the child process finished its execution, the parent process can start its next activity. The two processes can exchange information between them either when the child process starts its execution or when the child process finishes its execution, according to the property assigned to the sub-process activity.

FIG. 13 shows an asynchronous option. Under the asynchronous option, the child process starts its execution, when the workflow of the parent process reaches the sub-process activity. Unlike the synchronous option, the parent process continues the activities following the sub-process activity, without waiting for the completion of the child process. Therefore, the two processes can exchange information only when the child process starts to execute. In this case, only the parent process can pass the related information to the child process, not vice versa.

Process Model Data Locking Mechanism

Many people can manage the process model. A plurality of participants with a proper authority may access, view and edit the same process model. In order to keep the consistency in the process model data, it is necessary to keep other participants from accessing the process model data, when the process model data is being modified.

The process designer of the preferred embodiment of the present invention can maintain the consistency of the process model data through the user's check-in and check-out.

As shown in FIG. 14, if one participant checks-out the process model for editing or modification, other participants cannot access the process model until the participant that checked-out the model checks-in. Once the process model is checked-in, the other participant may check-out the process model and modify it.

The preferred embodiment of the present invention sets up a check-out table in order to implement the process model data locking mechanism. When a user requests to check-out a business process, the process designer refers to the check-out table to confirm that there is information on the business process. If the information is not found, the process designer allows the requestor to check-out the business process after adding to the check-out table the information on the requested business process and the requester. If the checkout table contains the information on the requested business process, the process designer keeps the requestor from checking out the business process and sends a message to the requestor. When the user who checked-out and finished to edit the business process asks to check-in the process, the process designer deletes the information on the process and the user from the checkout table.

FIG. 15 is a schematic diagram illustrating how the preferred embodiment of the present invention exchanges process model data with other process designer. The process designer of the preferred embodiment provides a tool with a graphic user interface that enables the user to design the business process with ease. As shown in FIG. 15, the process model data comprises graphic data and property data. Graphic data helps the user visualize the workflow of the business process. Property data show the logical steps of the business rule associated with the business process. The process designer can provide data structures that are optimized and standardized. Such data structures maximize the system efficiency and enable the system to exchange data under the distributed system and among different systems.

Graphic data represent any graphic information of the process model, such as activity icons, transition arrows, text descriptions and so on. The process designer stores the information in the format of SVG (Scalable Vector Graphics), which is a standard format for image in the World Wide Web. SVG file is an XML (extensible Mark-up Language) type file including encoded images, lines, arrows and descriptions.

Property data represent information on the properties of the business process model. The preferred embodiment stores the property data in an XML format using Workflow Definition Language (WfDL) of Workflow Management Coalition (WfMC).

The process designer of the preferred embodiment stores the information on the process model in the standard XML format to enable the system exchange process model data among different workflow management system.

Process Engine

Process engine actually implements and executes the process model designed by the process designer. Process engine automatically allocates activities to the participants, stores the execution results, maintains the schedule of the activities, and manages the security of the business process.

The preferred embodiment has a process engine that comprises a request manager, a dispatcher, a scheduler, a security manager, a database broker, and an interface agent. FIG. 16 shows a schematic diagram of the process engine of the preferred embodiment.

The request manager handles all the requests coming from the clients that users are using. The request manager receives and responds to all the user's requests, such as log-in, reference to the worklist and executes the activity.

When a user logs in the system from the client, the request manager verifies the user identity. If the external certification is necessary, the request manager asks the security manager for a certification from the outside certification server.

Once the user successfully logs in the system, the request manager initializes the user's individual status and sends it to the client.

If the user requests a reference to the work list, the request manager sends a query to the database and returns the results to the user at the client.

The request manager may receive the user's request to manage folders and creates, deletes and edits the folder and reports back to the user.

Also, when the user reports that he finished the assigned activity, the request manager stores the results in the queue so that the dispatcher can handle the request.

The dispatcher actually executes the activities according the request stored in the queue. It transmits the activity results to the database broker for the storage in the database. The dispatcher also sends to the security manager a certification request when necessary. When the activities are finished normally, the dispatcher allocates the activity to the participant of the next step and notifies the participant.

The scheduler manages the deadline and the wait activity. When the deadline or the alert time arrives, the scheduler takes appropriate steps as defined in the alert information. When there is an exception path for delayed execution, the scheduler redirects the workflow to the exception path. Also, the scheduler directs the workflow to the next activity, when the waiting period for the wait activity elapses.

Security manager receives the certification request from the request manager, dispatcher or scheduler, and asks the outside certification server for a certification and performs encoding or decoding.

Database broker receives various requests on the data from the request manager dispatcher or scheduler, and executes the requests and returns the result to them.

Interface agent uses workflow XML (Wf-XML) to exchange data and information with different types of process engine.

In the business process, each activity goes through different states. After the activity is initiated, it changes its state as it is executed. The dispatcher in the process engine monitors the states of each activity and controls them throughout the execution. FIG. 17 shows the states of activities and the transition diagram.

"Initial" state is where the activity is initiated for its execution. From this state, if the participant starts activity or the mail activity or agent activity consummates, the activity transits its state to "running". When a sub-process requires a manual intervention from the participant, the state transits to "waiting". The state transits to "dead" if the activities can't be reachable or be activated by the workflow according to the current path conditions.

As shown in FIG. 17, "waiting" state can be entered only when the activity is sub-process activity and the linked sub-process has to be started manually by the participant of the sub-process activity ( manual start option). When the sub-process activity is activated, the state of that activity transits from "initial" to "waiting". When the participant of the activity finishes the preparations to start of the linked sub-process and the sub-process starts successfully, the parent sub-process activity transits from "waiting" to "running".

FIG. 18 illustrates an example of "dead" state. If activity 1 is completed and moves to activity 2 according to the path condition 1, activity 3 enters "dead" state. In other words, if the current sets of path conditions do not allow the workflow to execute a certain activity (in this case activity 3), the activity transits to "dead" state. However, in FIG. 18, after completing activity 4, the path condition 2 may be taken. Then the "dead" state of activity 3 and the "complete" state of activity 2 transit to the "initial" state.

"Running" state indicate that the participant is executing the activity either automatically or manually. When the activity finished normally, the state transits to "complete".

The activity enters "complete" state when the activity in the state of "running" or "overdue" is normally finished. The activity may transit from "complete" to "initial" by a loop transition, as shown in FIG. 18.

The activity in the "running" state enters the "suspended" state when the participant suspends the activity. The state again transits to "running" when the participant resumes the activity.

The activity enters the "terminated" state when the participant forced to stop the activity.

The "error" state indicates that errors have occurred during the execution of the activity. When either the manually executed or the automatically executed activity such as mail, agent and SQL activities, makes an error, the activity enters the "error" state. The participant may correct the error and the activity then enters into the "running" state.

Overdue state is entered when the activity in the "running" state passed the deadline. The activity may enter the "complete" state when it is finished.

The preferred embodiment has the process engine move the process from one activity to the other activity as the activity is completed. The process engine controls the workflow using transition count in order to insure that the business process transits according to the business rule. When more than one transition merges together, the transition count helps the consistency of the business process flow.

FIG. 19 shows an example of a merged transition. Using this example, it is explained how the transition count can keep the consistency of the business process flow. It is assumed that activity 1 is completed. Activity 2 and activity 3 are to be executed according to transition conditions. As soon as activity I is complete, transition 1 and transition 3 are initialized at the same time. If activity 2 is completed first, then the transition 2 is initiated and transition 4 is not initiated yet. If the business rule for activity 4 requires that both transition 2 and transition 4 are initiated in order for the activity 4 to start, activity 4 has to wait till the activity 3 is completed and the transition 4 is initiated. In order to handle such merge transitions consistently, it is helpful to use the transition count.

It is explained using the example of FIG. 19. When the activity 1 is started, the transition count of all the transitions that can be processed in a forward direction is all set to zero (0). Therefore, the transition counts of transitions 1 through 5 become zero (0).

When activity 1 is completed, the transition counts of all the transition that may stem from activity 1 are set to one (1). Now, transition counts of transition 1 and transition 3 are set to one (1).

In the same way, when activity 2 is completed, the transition count of transition 2 becomes one (1). The transition count of transition 4 becomes one (1), when activity 3 is completed.

If the condition to start activity 4 is set as the sum of the transition count of the transition entering the activity be two (2), the activity 4 can only start when the transition counts of both transition 2 and transition 4 are one (1).

The example shown in FIG. 20 is more complicated. When activity 1 and activity 2 are complete, activity 3 and activity 4 can be started. Suppose that activity 4 is complete and the transition 5 is initiated. However, activity 3 may transit to transition 6 rather than to transition 4, depending on the business rule and the execution result of activity 3. Let's assume that activity 3 transit to transition 6 and activity 1 has to be executed again. Then, depending on the execution result of activity 2, activity 3 and activity 4 are to be executed again. In such a case, the previous execution result of activity 4 has to be disregarded and the initiated transition 5 must be deactivated. Otherwise, by simply initiating transition 4 after completing the activity 3, activity 5 may start its execution based on the previously initiated transition 5.

Transition count may prevent such problems. When transition 6 is initiated and activity 1 starts to begin, transition counts of all the transition in the forward direction from activity 1 are set to zero (0). In other words, by setting the previously initiated transition count of transition 5 to zero (0), activity 5 cannot be started unless both activity 3 and activity 4 are completed.

The preferred embodiment can control the business process dynamically with consistence, by using transition count.

As the activity of the business process starts, the activity is allocated to the participant, who executes the activity using an application program. The activity allocated to the participant is called workitem. The application program that is used for executing the workitem is called a workitem application. FIG. 21 describes creation and storage of application data generated by the workitem application program.

Workitem application is created referring to the activity application that is assigned to the activity during the business process design. In most cases, process designer assigns application programs to the activity. However, in some cases, the application program may be dynamically determined by using a process variable. Participants execute workitems using workitem applications. A plurality of workitem applications may be used for executing one workitem.

Application data generated as the workitem is executed, are physically stored in the file system. Workitem application table keeps the file identifier representing the address of each workitem application's data in order to map the workitem application with the actual data file in the file system.

File identifier allows the system to share the same application data while executing different workitems in the same business process. It is illustrated in FIG. 22. Each workitem application table may keep the same file identifier in order to share the application data executed in the previous workitem with the next workitem. This is the case when the business rule dictates that the result of the previous workitem is to be used by the participant to execute the next workitem.

The preferred embodiment of the present invention provides varieties of sharing options for the application data to support the flexibility of application data sharing.

FIG. 23 illustrates application data sharing options among activities in the same business process. "New" is an option that creates a new application data file when executing a workitem. "Open" is an option that opens and shares an existing application data file of the same application. "New and open" is an option that creates a new application data file when the activity is first executed and then the existing application data file is shared when the activity is repeated by a loop transition.

Application data may be modified at the same time by the participants that execute the same activity or the different activities when the application data files are shared. The preferred embodiment provides an application data locking mechanism through check-in and check-out steps in order to ensure the consistency of the application data.

As shown in FIG. 24, if a participant checks out application data to modify them, other participants must wait until the participant that checked out the application checks in. The other participants cannot check out and edit the application data until they are checked in.

The preferred embodiment provides a check-out table in the database to implement the data locking mechanism. When a participant requests to check out application data, the system refers to the check-out table to determine that the table contains information on the requested application data. If the table does not contain the information on the requested application data, the system stores the information on the requestor and the requested application data and allow the participant to check out the application data. If the table contains the information on the requested application data, the system does not allow the data to be checked out. When the participant who has checked out the application data finished editing the data and requests to check in the data, the system deletes the information on the requestor and the application data from the check-out table.

Although preferred embodiments of the present invention have been described in detail hereinabove, it should be clearly understood that many variations and/or modifications of the basic inventive concepts herein taught that may appear to those skilled in the present art will still fall within the spirit and scope of the present invention, as defined in the appended claims. For example, it should be clear to those in the art that the invention can also be applied to other area that can employ a workflow management system.

What is claimed is:

1. A workflow management system for automating a business process, comprising:
    a computer;
    an administrator executable by the computer, wherein the administrator manages automating the business process and comprises an organization manager, a role/group manager, an authority manager, a process manager, and a folder manager;
    a process designer executable by the computer, wherein the process designer determines flows and properties of the business process and defines an activity that is performed in the business process;
    a database accessible by both the administrator and the process designer, wherein the database stores organization information, authority information, and folder information relating to the business process;
    a process engine executable by the computer, wherein the process engine executes the business process and allocates the activity to the participant, monitors a start and end of the activity, facilitates storing a result of the activity, and/or interfaces with the database, another workflow engine, and/or a business application program;
    a web client, that interfaces with the process engine, the another workflow engine, and/or the business application program, and wherein the web client permits a user to interact with the system; and
    a form generator executable by the computer, wherein the form generator designs and operates an electronic form related to the business process, and wherein the form generator interfaces with the database, the process designer, the process engine, the web client, and/or the business application program.

2. The workflow management system of claim 1,
    wherein the organization manager creates, deletes, and maintains information about a department associated with the business process;

wherein the role/group manager creates, deletes, and maintains information about a role and a user group associated with the business process;

wherein the authority manager creates, deletes, and maintains information about an authority that can access the business process and the application program, and wherein the authority manager further allocates the authority information to the information about the role, the group and a member of at least one of the department and the user group; and wherein the folder manager creates, deletes, and maintains information about a folder.

3. The workflow management system of claim 2, further comprising an object manager, wherein the object manager interfaces the administrator with the database.

4. The workflow management system of claim 3, wherein the database further comprises:
an organization database;
authority database; and
a folder database.

5. The workflow management system of claim 1, wherein the process designer comprises:
a graphic designer executable by the computer that creates and designs an activity and the business process using a graphical user interface; and
a property designer executable by the computer that defines a property of the activity to be executed in the business process.

6. The workflow management system of claim 5, wherein the property designer further comprises an object manager that interfaces the designer with the database.

7. The workflow management system of claim 6, wherein the database comprises:
a process definition folder that contains information related to the business process modeling;
a data folder that contains data generated by the business process execution; and
an organization folder.

8. The workflow management system of claim 1, wherein the web client further comprises:
a worklist handler;
a workitem handler; and
a process monitor.

9. The workflow management system of claim 8, wherein the worklist handler maintains a work list for a user.

10. The workflow management system of claim 9, wherein the workitem handler supports execution of the business process.

11. The workflow management system of claim 10, wherein the process monitor checks status of the business process.

12. The workflow management system of claim 11, wherein the process monitor further checks a history of the business process and current progress of the business process.

13. The workflow management system of claim 12, wherein the process monitor further monitors resource utilization.

14. The workflow management system of claim 2, wherein the organization manager further creates, deletes and maintains i) information about relationships between the department, rank of a member in the department and/or user group, and ii) information regarding the member in the department and/or user group.

15. The workflow management system of claim 14, wherein the organization manager further registers a signature of each member of the department and/or user group.

16. The workflow management system of claim 2, wherein the role/group manager allocates the member information to the role information and the user group information.

17. The workflow management system of claim 2, wherein the authority manager allocates the authority information to information about the role, the group and the member of the department and/or the user group.

18. The workflow management system of claim 5, wherein the property designer creates, deletes, and maintains a business rule associated with the business process.

19. The workflow management system of claim 18, wherein the business rule includes information that defines a term associated with the business process, defines a condition associated with the business process, and/or defines a transition path to be used when the activity is completed.

20. The workflow management system of claim 5, wherein the process designer further comprises a check-out table.

21. The workflow management system of claim 20, wherein the check-out table contains information on a process model currently checked-out by a user.

22. The workflow management system of claim 21, wherein the system keeps a currently checked-out process model from being simultaneously checked-out by another user by referring to the check-out table.

23. The workflow management system of claim 1, wherein the process engine comprises:
an interface agent that interchanges information about a status of the business process with other process engines;
a request manager that receives requests from the user, directs the process engine to handle the requests, and returns results to the user;
a dispatcher that retrieves and executes the requests and stores results in the database;
a scheduler;
a security manager that controls a certification process with an outside certification server; and
a database broker that interfaces with the process engine and the database.

24. The workflow management system of claim 23, wherein the process engine allocates the activity to the participant and a status the activity comprises one of a state selected from the group consisting of: an initial state; a waiting state; a dead state; a running state; a suspended state; a completed state; a terminated state; an error state; and an overdue state.

25. The workflow management system of claim 23, wherein the scheduler manages a deadline of the activity and/or a waiting state of the activity.

26. The workflow management system of claim 23, wherein the security manager further encodes and decodes information.

27. The workflow management system of claim 24, wherein the activity transits among the states according to a business rule.

28. The workflow management system of claim 27, wherein the process engine controls the workflow using a transition count to keep the transitions between activity states consistent with the business rule.

29. The workflow management system of claim 28, wherein the process engine sets to zero the transition counts of all the transitions that can be processed in a forward direction from the activity, when the activity is started.

30. The workflow management system of claim 29, wherein the process engine further sets to one the transition counts of the transitions stemming from execution of the activity, when the activity is completed.

31. A method for automating a business process, the method comprising steps of:
- modeling the business process, wherein the step of modeling includes generating an organization chart;
- defining an activity that is performed in the business process;
- accessing, from a database, organization information, authority information, and/or folder information relating to the business process;
- executing the business process, wherein the step of executing the business process includes allocating the activity to a participant, and designing and creating an electronic form related to the business process; and
- monitoring the business process, wherein the step of monitoring the business process comprises monitoring a start and end of the activity, facilitating storing a result of the activity, and/or interfacing with a workflow program and/or business application program.

32. The method of claim 31, wherein the step of modeling the business process further comprises:
- mapping at least one of departments, members, member titles and member roles to
- generate the organization chart;
- creating a role; and
- allocating an authority to the role.

33. The method of claim 31, wherein the step of modeling the business process further comprises:
- mapping at least one of departments, members, member titles and member roles to generate the organization chart;
- creating a group of human resources; and
- allocating an authority to the group of human resources.

34. The method of claim 31, wherein the step of designing a process further comprises:
- identifying an activity to be executed; and
- allocating a property to the activity.

35. The method of claim 34, wherein the activity comprises:
- a start activity that starts a process;
- a normal activity that involves an intervention by a participant;
- a wait activity;
- a mail activity;
- an SQL activity that accesses an application database;
- a sub-process activity that comprises a plurality of separate activities;
- an agent activity that automatically activates a program;
- a connector activity; and
- an end activity that represents an end of the process.

36. The method of claim 34, wherein the property comprises:
- participant information that describes an individual that executes the activity;
- application information that describes a business application to be used by the individual to execute the activity;
- post-condition information that determines when the activity is completed;
- schedule information that describes planning of the activity;
- deadline information that describes timing for executing the activity;
- sub-process information that describes a location and an option of the sub-process activity;
- parameter information that defines a value necessary for executing a program in an agent activity;
- mail-to information that determines a recipient of e-mail in a mail activity;
- mail content information that represents the content of e-mail in the mail activity;
- general information that shows a name and description of the activity;
- transition condition information that represents conditions for an input transition and an output transition; and
- icon information to display an icon on a graphical user interface.

37. The method of claim 34, wherein the participant can comprise one of or any combination of a user, a department and the role.

38. The method of claim 37, wherein the participant can be a manager of the participant.

39. The method of claim 37, wherein the participant can be a peer of the participant.

40. The method of claim 37, wherein the participant can be a department of the participant.

41. The method of claim 37, wherein activity is allocated based on a workload of the participant.

42. The method of claim 31, wherein generating an organization chart comprises mapping information about a department, a member name, a member title, and a member role.

* * * * *

UNITED STATES PATENT AND TRADEMARK OFFICE
CERTIFICATE OF CORRECTION

PATENT NO. : 7,653,566 B2 Page 1 of 1
APPLICATION NO. : 09/725933
DATED : January 26, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Twenty-third Day of November, 2010

David J. Kappos
*Director of the United States Patent and Trademark Office*